(12) United States Patent
Wu et al.

(10) Patent No.: US 11,982,345 B2
(45) Date of Patent: May 14, 2024

(54) MOTOR ASSEMBLY

(71) Applicant: Nidec Corporation, Kyoto (JP)

(72) Inventors: Keng-Chang Wu, Taipei (TW);
Guo-Jhih Yan, Taipei (TW)

(73) Assignee: NIDEC CORPORATION, Kyoto (JP)

( * ) Notice: Subject to any disclaimer, the term of this patent is extended or adjusted under 35 U.S.C. 154(b) by 83 days.

(21) Appl. No.: 17/638,334

(22) PCT Filed: Aug. 27, 2020

(86) PCT No.: PCT/JP2020/032468
§ 371 (c)(1),
(2) Date: Feb. 25, 2022

(87) PCT Pub. No.: WO2021/039931
PCT Pub. Date: Mar. 4, 2021

(65) Prior Publication Data
US 2022/0299103 A1    Sep. 22, 2022

(30) Foreign Application Priority Data
Aug. 30, 2019  (CN) .......................... 201910813272.6

(51) Int. Cl.
*F16H 57/04* (2010.01)
*F16H 49/00* (2006.01)
*F16H 57/02* (2012.01)
*H02K 7/116* (2006.01)

(52) U.S. Cl.
CPC ..... *F16H 57/0427* (2013.01); *F16H 57/0434* (2013.01); *F16H 57/045* (2013.01); *F16H 57/0471* (2013.01); *F16H 57/048* (2013.01); *F16H 49/001* (2013.01); *F16H 2057/02034* (2013.01); *H02K 7/116* (2013.01)

(58) Field of Classification Search
CPC .............. F16H 49/001; F16H 57/0406; F16H 57/0421; F16H 57/0427; F16H 57/045; F16H 57/0471; F16H 57/048; F16H 57/0482; F16H 2057/02034; H02K 7/116
See application file for complete search history.

(56) References Cited

U.S. PATENT DOCUMENTS

2018/0328410 A1* 11/2018 Schofield ................ F04C 18/12

FOREIGN PATENT DOCUMENTS

| CN | 203884196 U | * | 10/2014 | |
| CN | 105864365 A | | 8/2016 | |
| DE | 10225718 A1 | * | 1/2004 | ............ B62D 3/123 |
| JP | 49-72917 U | | 6/1974 | |
| JP | 6370944 B1 | * | 8/2018 | |
| TW | 201706522 A | | 2/2017 | |
| TW | M549284 U | | 9/2017 | |

OTHER PUBLICATIONS

Official Communication issued in International Patent Application No. PCT/JP2020/032468, dated Oct. 27, 2020.

* cited by examiner

*Primary Examiner* — Adam D Rogers
(74) *Attorney, Agent, or Firm* — Keating & Bennett, LLP

(57) ABSTRACT

A motor assembly includes a motor, a speed reducer attached to one axial end of the motor, and an oil feeder between the motor and the speed reducer. The oil feeder is made of a material having elasticity and capable of storing a lubricating substance. The oil feeder includes a first lubrication portion that lubricates a gear of the speed reducer and a second lubrication portion that lubricates a bearing of the speed reducer.

12 Claims, 8 Drawing Sheets

MOTOR ASSEMBLY

CROSS-REFERENCE TO RELATED APPLICATIONS

This is a U.S. national stage of application No. PCT/JP2020/032468, filed on Aug. 27, 2020, with priority under 35 U.S.C. § 119(a) and 35 U.S.C. § 365(b) being claimed from CN Patent Application No. 201910813272.6, filed on Aug. 30, 2019, the entire disclosures of which are hereby incorporated herein by reference.

1. FIELD OF THE INVENTION

The present disclosure relates to mechanical electricity.

2. BACKGROUND

In conventional techniques, a region (alternatively, a member, a space, or the like) for storing a lubricating substance can be provided inside a speed reducer to lubricate a bearing of the speed reducer. For example, a harmonic drive speed reducer is capable of lubricating a corresponding member (bearing) of the harmonic drive speed reducer with a stored lubricating substance by being provided with an oil seal for storing lubricating grease, the oil seal being provided between an inner peripheral surface of a flex spline of the harmonic drive speed reducer and an outer peripheral surface of an input shaft, or an oil reservoir space provided between an inner diameter side of the flex spline of the harmonic drive speed reducer and a harmonic generator. Alternatively, when the speed reducer is provided with an oil filling hole to allow lubricating grease to be injected into the speed reducer from the outside of the speed reducer through the oil filling hole, a member (e.g., a gear) in the speed reducer can be lubricated.

It should be noted that the foregoing introduction to the technical background is merely described for convenience of clearly and completely describing the technical content of the present application and for ease of understanding by a person skilled in the art. The technical content is described in the background of the present application, so that the above technical content cannot be regarded as known to a person skilled in the art.

The inventors have discovered that a method for providing a region for storing the lubricating substance inside the speed reducer is capable of only lubricating the bearing of the speed reducer without lubricating the gear of the speed reducer, and that a method for providing the oil filling hole in the speed reducer is likely to cause material fatigue of a part provided with the oil filling hole when the part is stressed because the oil filling hole is directly processed in the speed reducer, thereby shortening the life of the speed reducer and affecting accuracy thereof.

SUMMARY

According to an example embodiment of the present application, there is provided a motor assembly including a motor, a speed reducer attached to one axial end of the motor, and an oil feeder between the motor and the speed reducer, the oil feeder being made of a material having elasticity and capable of storing a lubricating substance, and the oil feeder including a first lubrication portion to lubricate a gear of the speed reducer, and a second lubrication portion to lubricate a bearing of the speed reducer.

In one or more example embodiments, the first lubrication portion is in contact with the gear, and the second lubrication portion is in contact with the bearing.

In one or more example embodiments, each of the first lubrication portion and the second lubrication portion protrudes toward the speed reducer with respect to a surface of the oil feeder, the surface opposing the speed reducer.

In one or more example embodiments, the motor is provided with a surface opposing the speed reducer, the surface including at least one first protrusion that presses the oil feeder toward the speed reducer to define the first lubrication portion, and at least one second protrusion that presses the oil feeder toward the speed reducer to define the second lubrication portion.

In one or more example embodiments, the first protrusion is integral with or separate from the motor, and the second protrusion is integral with or separate from the motor. In one or more example embodiments, the first lubrication portion and the second lubrication portion are located and aligned in a radial direction of the oil feeder.

In one or more example embodiments, the first lubrication portion and the second lubrication portion are provided at an interval in a circumferential direction of the oil feeder.

In one or more example embodiments, the first lubrication portion is one of multiple first lubrication portions and the second lubrication portion is one of multiple second lubrication portions.

In one or more example embodiments, the motor includes a rotor, the oil feeder is in the rotor to be rotatable with the rotor, and the oil feeder is between the rotor and the speed reducer.

In one or more example embodiments, the speed reducer is a harmonic drive reducer, the gear is a harmonic drive gear, the harmonic drive gear includes an internally toothed gear and an externally toothed gear, and the first lubrication portion is insertable between the internally toothed gear and the externally toothed gear.

The above and other elements, features, steps, characteristics and advantages of the present disclosure will become more apparent from the following detailed description of the example embodiments with reference to the attached drawings.

BRIEF DESCRIPTION OF THE DRAWINGS

Specific implementations and example embodiments of the present application are disclosed in detail with reference to the following description and the accompanying drawings, and an aspect in which the principles of the disclosure may be used is specified. It should be considered that the example embodiments of the present application are not limited in scope. Within the scope of the spirit and terms of the appended claims, the example embodiments of the present application include many changes, modifications, and equivalents.

The drawings included are provided for a further understanding of the example embodiments of the present application and illustrate the example embodiments of the present application and describe the principles of the present application together with text description. The following drawings are merely some example embodiments of the present application, and another drawing may be obtained based on these drawings on the premise that a person skilled in the art does not pay inventive labor.

DETAILED DESCRIPTION

With reference to the drawings, the above and other features of the present application will be clarified by the following specification. In the specification and drawings, specific example embodiments of the present application are disclosed, and some example embodiments are shown in which the principles of the present application can be used. It should be understood not only that the present application is not limited to the example embodiments described, but also that the present application includes all amendments, modifications, and equivalents within the scope of the claims described.

In the description of example embodiments of the present application, the terms "first", "second", and the like are used to distinguish different elements from a nominal call, but do not indicate a spatial placement, a time sequence, or the like of these elements, and these elements should not be limited by these terms. The terms, "and/or" and "and/alternatively" include any one and all combinations of one or more of terms associated and listed. The terms, "including", "comprising", "having", and the like, refer to presence of stated features, elements, devices, or assemblies, but do not preclude the presence/addition of one or more other features, elements, devices, or assemblies.

In the example embodiments of the present application, singular forms "a", "the", and the like are not to be limited to meaning of "one" but may include a plural form unless otherwise stated in context. Thus, the singular forms are to be understood in a broad sense as "present" or "one type", and the term, "the", is to be understood to include both the singular form and the plural form. Unless otherwise stated in context, the term, "based on", should be understood as "at least partly based on", and the term, "on the basis of", should be understood as "at least partly on the basis of".

In the following description of the example embodiments of the present application, a direction parallel to a direction extending along an axis (e.g., O-O') is referred to as an "axial direction", a radial direction around the axis is referred to as a "radial direction", a direction around the axis is referred to as a "circumferential direction", and an O side of the central axis O-O' is referred to as an "up" and an "above", for ease of description. It should be noted that any of the foregoing is merely for convenience of description and is not intended to limit a direction of this motor assembly at the time of use and manufacturing. Hereinafter, the example embodiments of the present application will be described with reference to the drawings.

Figure 1:
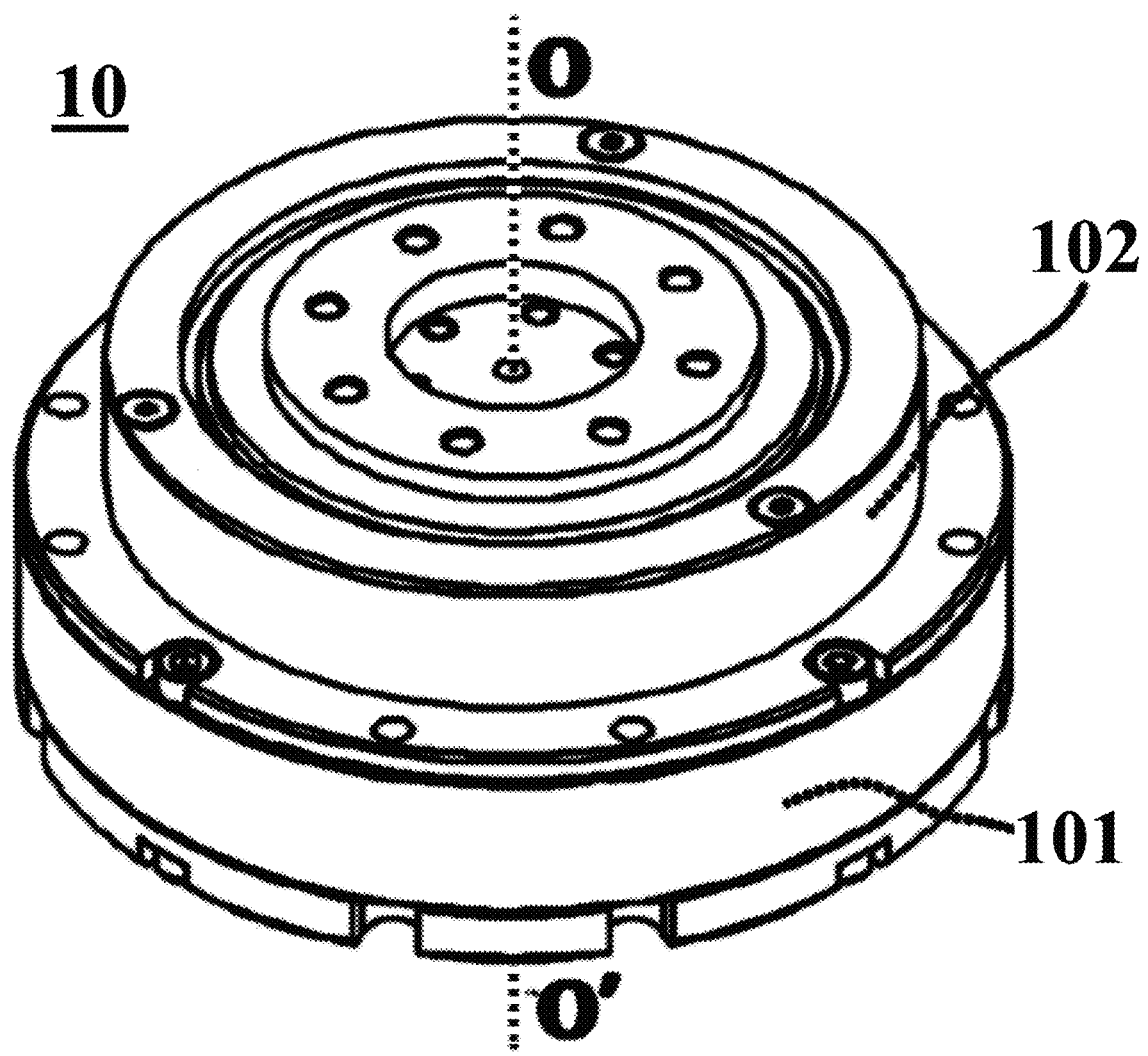
FIG. 1 is a schematic view of an example of a motor assembly according to an example embodiment of the present application.
Figure 2:
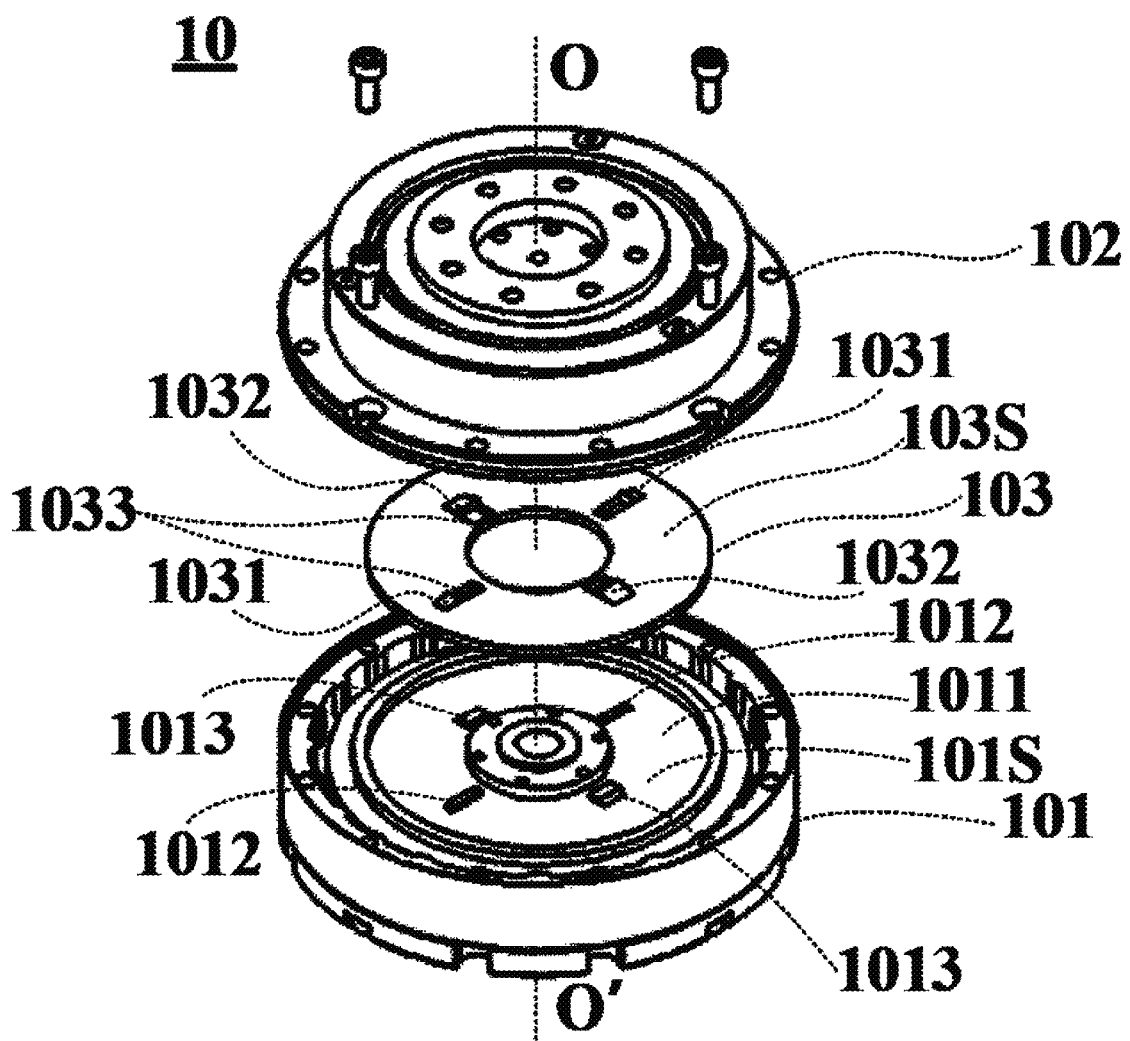
FIG. 2 is an exploded view of the motor assembly illustrated in FIG. 1.

The example embodiments of the present application provides a motor assembly. FIG. 1 is a schematic view of an example of a motor assembly according to the example embodiments of the present application, and illustrates a motor, an oil feeder, and a speed reducer that are in an assembled state. FIG. 2 is an exploded view of the motor assembly illustrated in FIG. 1, and illustrates the motor, the oil feeder, and the speed reducer that are in a non-assembled state.

As shown in FIGS. 1 and 2, a motor assembly 10 includes a motor 101 and a speed reducer 102 attached to one axial end (near an end in an O direction) of the motor 101. The motor assembly 10 further includes an oil feeder 103, and the oil feeder 103 is disposed between the motor 101 and the speed reducer 102 as illustrated in FIG. 2. The oil feeder 103 includes a first lubrication portion 1031 and a second lubrication portion 1032.

Figure 4:
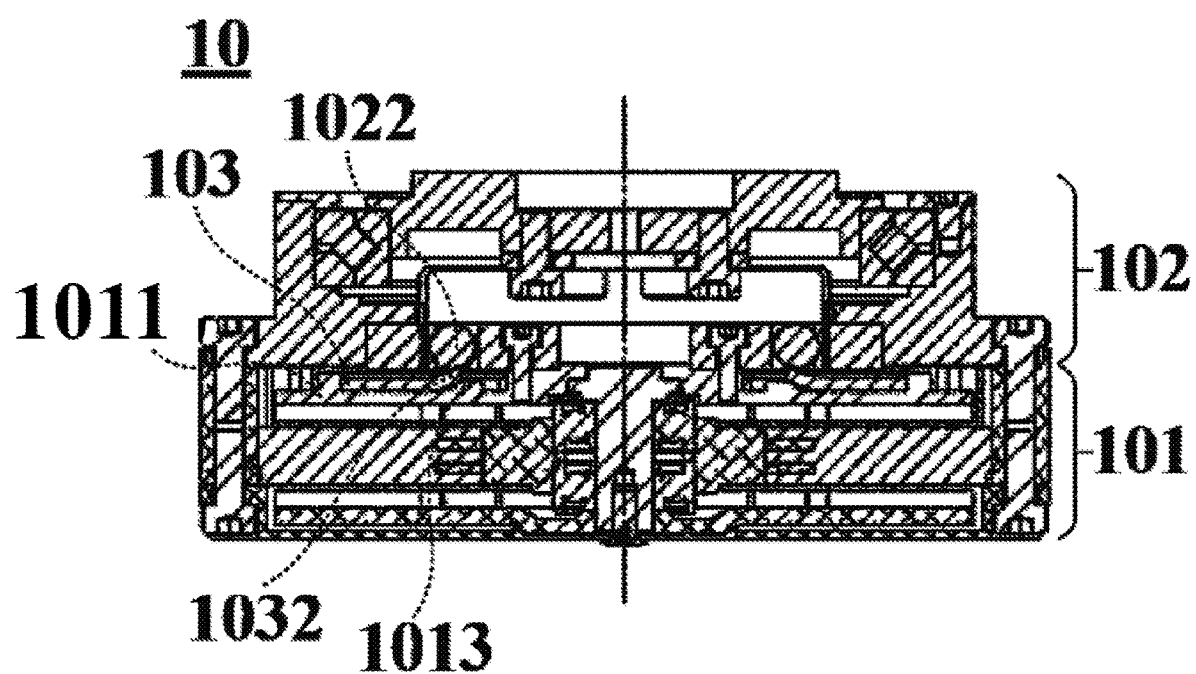
FIG. 4 is a sectional view of the motor assembly taken along line A-A illustrated in FIG. 3 along an axial direction.
Figure 5:
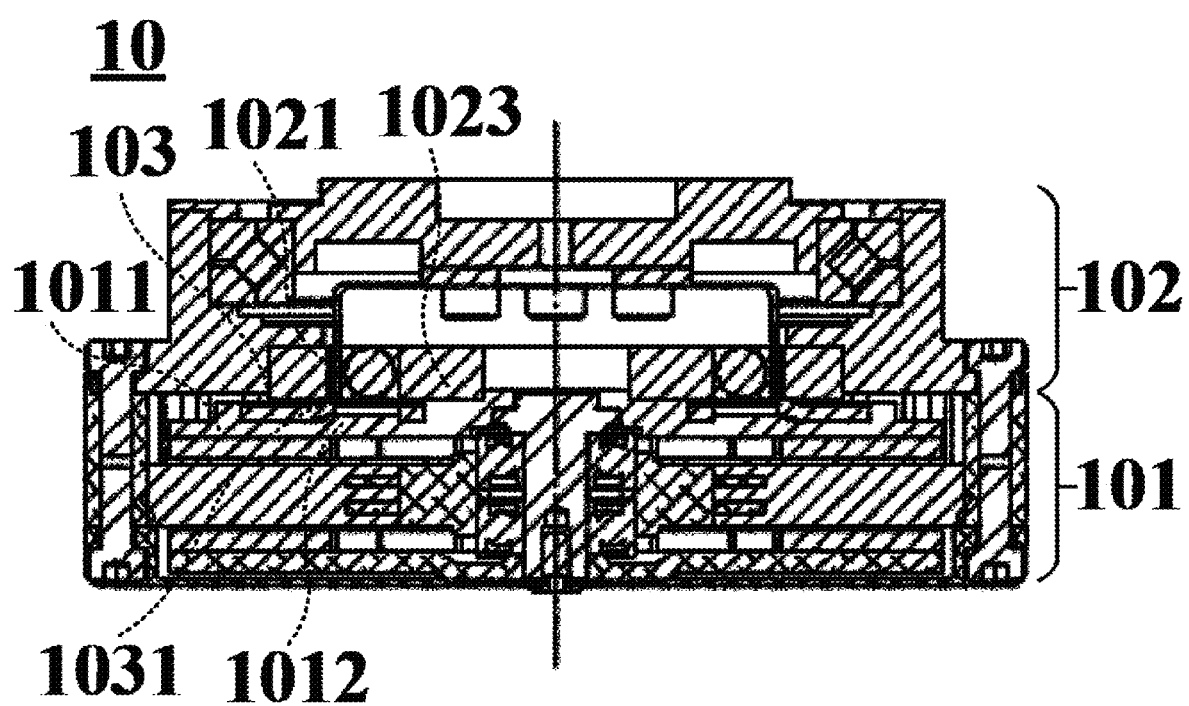
FIG. 5 is a sectional view of the motor assembly taken along line B-B illustrated in FIG. 3 along the axial direction.

In the example embodiment of the present application, the oil feeder 103 is made of a material having elasticity and capable of storing a lubricating substance, and includes the first lubrication portion 1031 that is used to lubricate a gear 1021 (as illustrated in FIG. 5) of the speed reducer 102, and the second lubrication portion 1032 that is used to lubricate a bearing 1022 (as illustrated in FIG. 4) of the speed reducer 102.

As can be seen from the above example embodiment, the oil feeder 103 is disposed between the motor 101 and the speed reducer 102, and the first lubrication portion 1031 and the second lubrication portion 1032 of the oil feeder 103 lubricate the gear 1021 and the bearing 1022 of the speed reducer 102, respectively. As a result, the bearing and the gear of the speed reducer can be lubricated simultaneously without changing the design of the speed reducer, and the life and accuracy of the speed reducer can be secured.

In one or more example embodiments, the motor 101 may be one of various general motors, and includes members provided in a typical motor, such as a stator, a rotor, and the like. Specifically, a related art can be referred to, but description thereof is eliminated herein. The speed reducer 102 is one of various speed reducers, for example, a harmonic drive speed reducer, and includes a gear and a bearing on a side of the harmonic drive speed reducer, the side facing the motor 101 when the harmonic drive speed reducer is attached to the motor. The oil feeder 103 of the example embodiment of the present application lubricates the gear and the bearing.

Although it should be noted that the harmonic drive speed reducer is merely an example of the speed reducer of the example embodiment of the present application, the present application is not limited to the harmonic drive speed reducer. When a speed reducer is attached to a motor and includes a gear and a bearing that are provided on a side of the speed reducer, the side facing the motor, the speed reducer is within the scope described in the specification of the present application.

In one or more example embodiments, the motor 101 includes a rotor 1011, and the oil feeder 103 is disposed between the rotor 1011 and the speed reducer 102, the oil feeder 103 being disposed in the rotor 1011 to be rotatable with the rotor 1011, as illustrated in FIG. 2. It should be noted that the above placement form of the oil feeder 103 is an example, and the present application does not limit a method for assembling the motor 101 and the speed reducer 102. The motor 101 may include a member other than the rotor 1011, the member facing the speed reducer 102, and the oil feeder 103 may be provided in another member.

In one or more example embodiments, the oil feeder 103 is also referred to as an oil reservoir block, an oil reservoir, or the like. The oil feeder 103 may be made of a material such as sponge or plastic, but the present application does not limit the material. The oil feeder 103 may be made of another material that has elasticity and is capable of storing a lubricating substance. In the example embodiment of the present application, the oil feeder 103 can be a sheet-like member molded by a simple press, such as a sponge sheet or a soft plastic sheet. This enables reduction in manufacturing cost of the oil feeder 103, simplification of a manufacturing method, and enhancement of product competitiveness.

In the example embodiment of the present application, the lubricating substance may be one of various general lubricants, such as one of various lubricating oils in an oily liquid form or various lubricating greases in an oil-like and semi-solid form, and the present application does not limit the lubricating substance. In the example embodiment of the present application, when a member to be lubricated (the gear, the bearing) has a little lubricating substance, the lubricating substance stored in the oil feeder 103 is supplied to the member to be lubricated to lubricate the member, and when the lubricating substance overflows from the member to be lubricated, the lubricating substance having overflowed can be collected in the oil feeder 103 and stored without overflowing, thereby reducing influence on the motor 101 and the speed reducer 103.

In one or more example embodiments, the first lubrication portion 1031 may come into contact with the gear of the speed reducer 102 to lubricate the gear, and similarly, the second lubrication portion 1032 may come into contact with the bearing of the speed reducer 102 to lubricate the bearing. For example, when the lubrication portion (the first lubrication portion 1031 or the second lubrication portion 1032) is in contact with the member to be lubricated (the gear or the bearing) and the member to be lubricated has a little lubricating substance, the lubricating substance stored in the oil feeder can be applied to the member to be lubricated through the lubrication portion due to siphonage, and a lubricating effect can be further enhanced.

However, the present application is not limited to the structure above. Even when the first lubrication portion 1031 is in non-contact with the gear and the second lubrication portion 1032 is in non-contact with the bearing, the lubricating effect on the gear and the bearing can be similarly achieved. For example, when the lubrication portion (the first lubrication portion 1031 or the second lubrication portion 1032) and the member to be lubricated (the gear or the bearing) are not in contact with each other, the oil feeder 103 rotating with the motor allows a lubricating substance having overflowed or shaken off from the member to be lubricated of the speed reducer 102 to be collected and stored in the oil feeder 103, and then the lubricating substance can be overflowed or shaken off to the member to be lubricated by the first lubrication portion 1031 and the second lubrication portion 1032.

In one or more example embodiments, each of the first lubrication portion 1031 and the second lubrication portion 1032 protrudes toward the speed reducer 102 with respect to a surface 103S of the oil feeder 103, the surface 103S facing the speed reducer 102, as illustrated in FIG. 2. This structure brings an advantage in supplying the lubricating substance to the member to be lubricated (the gear or the bearing) in the speed reducer 102. For example, the first lubrication portion 1031 and/or the second lubrication portion 1032 may be protrusions protruding toward the surface 103S, and the protrusions may have any shape such as a lip shape or the like, and the present application does not limit the shape. The protrusions and the oil feeder 103 may be formed by integral molding or separate molding, and the present application does not limit the molding, and thus a person skilled in the art can select as necessary. In one or more example embodiments, the first lubrication portion 1031 and/or the second lubrication portion 1032 may not protrude toward the speed reducer 102 with respect to the surface 103S of the oil feeder 103, the surface 103S facing the speed reducer 102. For example, the first lubrication portion 1031 and/or the second lubrication portion 1032 may be a partial region on a surface of an oil feeder in a tabular shape, the surface opposing the speed reducer 102, and the partial region corresponding to the member to be lubricated (the gear or the bearing) of the speed reducer 102. As a result, the oil feeder 103 can be manufactured by simple processing.

In one or more example embodiments, at least one first protrusion 1012 and at least one second protrusion 1013 are provided on a surface 1015 of the motor 101, the surface 1015 facing the speed reducer 102, as illustrated in FIG. 1. This structure enables the first protrusion and the second protrusion to press corresponding parts of the oil feeder 103 against the speed reducer 102, and brings an advantage in lubrication of the member to be lubricated of the speed reducer 102. For example, the surface 1015 is of the rotor 1011 of the motor 101, the surface 1015 facing the speed reducer 102, and the first protrusion 1012 and the second protrusion 1013 may be provided on the surface of the rotor 1011, but the present application is not limited to the surface. In the present example embodiment, the protrusions (the first protrusion 1012 and the second protrusion 1013) may be in any shape, and for example, may have a sectional shape along the radial direction, the sectional shape being the shape of a trapezoid, an arcuate protrusion, a square, or the like, and the present application does not limit the shape.

In one or more example embodiments, as illustrated in FIG. 2, when a cutout 1033 is formed radially inward of each lubrication portion (the first lubrication portion 1031 and the second lubrication portion 1032) of the oil feeder 103, the first protrusion 1012 and the second protrusion 1013 can be each accommodated in the cutout 1033 of the oil feeder. This structure enables the protrusions 1012 and 1013 to effectively press the oil feeder 103, but also the oil feeder 103 to be reliably attached to, for example, the rotor 1011 of the motor 101. That is, not only the oil feeder 103 and the rotor 1011 can be brought into close contact with each other, but also the protrusion and the cutout can be engaged with each other to prevent the oil feeder from being displaced with respect to the rotor. In the present example embodiment, the cutout 1033 is in any shape, and the present application does not limit the shape as long as the cutout can accommodate the corresponding protrusion. The cutout 1033 can also be formed at another position of the oil feeder 103, for example, formed radially outward of the lubrication portions 1031 and 1032, or at a circumferential position of the oil feeder 103. The present application does not limit the position, and a person skilled in the art can flexibly provide the cutout at a position suitable for actual needs.

In one or more example embodiments, the first protrusion 1012 can press the oil feeder 103 toward the speed reducer 102 to form the first lubrication portion 1031, and the second protrusion 1013 can press the oil feeder 103 toward the speed reducer 102 to form the second lubrication portion 1032. For example, when the oil feeder 103 is a tabular member, parts of the oil feeder 103, the parts corresponding to the members to be lubricated (the gear and the bearing) of the speed reducer 102, are pressed toward the speed reducer 102 by the first protrusion 1012 and the second protrusion 1013 to form the first lubrication portion 1031 and the second lubrication portion 1032, respectively, and thus the oil feeder 103 manufactured by simple processing can be used.

In one or more example embodiments, when the oil feeder 103 includes protrusions formed as the first lubrication portion 1031 and the second lubrication portion 1032 that protrude with respect to the surface 103S, the first protrusion 1012 and the second protrusion 1013 can press the oil feeder 103 toward the speed reducer 102, and thus, for example, can press the first lubrication portion 1031 and the second lubrication portion 1032, respectively, of the oil feeder 103 toward the speed reducer 102, or can press another part of the oil feeder 103 toward the speed reducer 102. This structure ensures contact between the lubrication portions 1031, 1032 and the member to be lubricated (the gear and the bearing) of the speed reducer 102, and increases a contact area between the first and second lubrication portions 1031, 1032 and the member to be lubricated (the gear and the bearing) of the speed reducer 102, thereby further enhancing lubrication effect. In one or more example embodiments, the first protrusion 1012 may be integrally formed with the motor 101, and besides this, the first protrusion 1012 may be further formed separately from the motor 101, and also the second protrusion 1013 may be integrally formed with the motor 101, and besides this, the second protrusion 1013 may be further formed separately from the motor 101. For example, the first protrusion 1012 may be integrally molded with the rotor 1011 of the motor 101, or may be provided in the rotor 1011 as a separate member, and the second protrusion 1013 may be integrally molded with the rotor 1011 of the motor 101, or may be provided in the rotor 1011 as a separate member. The present application does not limit molding, and a person skilled in the art can select as necessary.

In one or more example embodiments, the number of first lubrication portions 1031 formed in the oil feeder 103 may be one or more, and the number of second lubrication portions 1032 formed in the oil feeder 103 may be one or more. The present application does not limit the number, and a person skilled in the art can select as necessary. For example, although the number of the first lubrication portions 1031 and the number of the second lubrication portions 1032 illustrated in FIG. 1 are both two, besides this, the number of the first lubrication portions 1031 and the number of the second lubrication portions 1032 may be other numerical values. In this case, first protrusions 1012 and second protrusions 1013 as many as the first lubrication portions 1031 and the second lubrication portions 1032, respectively, can be formed on the surface 1015 of the motor 101, the surface 1015 facing the speed reducer 102.

In one or more example embodiments, the first lubrication portions 1031 and the second lubrication portions 1032 may be provided at intervals in the circumferential direction of the oil feeder 103. As illustrated in FIG. 2, the two first lubrication portions 1031 and the two second lubrication portions 1032 are provided at intervals in the circumferential direction of the oil feeder 103, the two first lubrication portions 1031 are provided facing each other, and the two second lubrication portions 1032 are provided facing each other. However, the present application is not limited to this placement, and a plurality of first lubrication portions 1031 (or second lubrication portions 1032) may be provided asymmetrically in the circumferential direction of the oil feeder 1031. The present application does not limit this placement, and a person skilled in the art can flexibly select as necessary.

Figure 3:
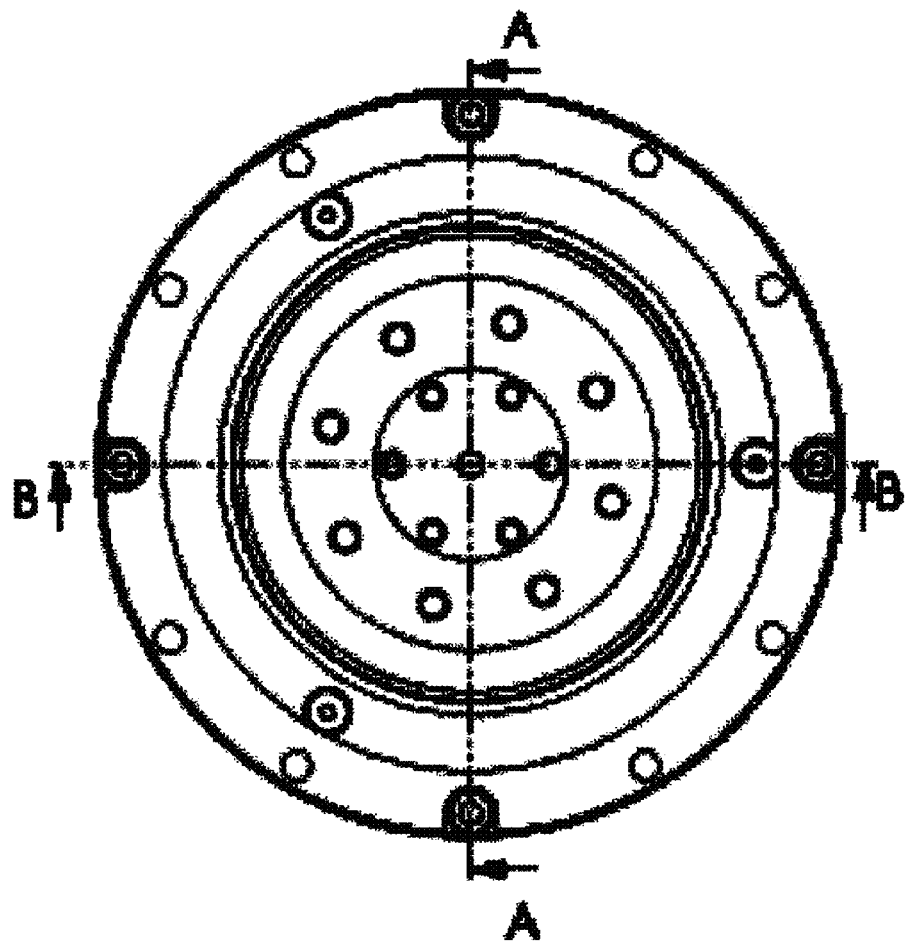
FIG. 3 is a plan view of the motor assembly illustrated in FIG. 1.

FIG. 3 is a plan view of the motor assembly illustrated in FIG. 1, and illustrates a state in which the motor assembly is viewed in plan view from one end of the speed reducer 102. FIG. 4 is a sectional example view of the motor assembly that is taken along line A-A illustrated in FIG. 3 along the axial direction, and that is taken at a position above the second lubrication portion 1032 of the oil feeder 103. FIG. 5 is a sectional example view of the motor assembly that is taken along line B-B illustrated in FIG. 3 along the axial direction, and that is taken at a position above the first lubrication portion 1031 of the oil feeder 103.

In the example embodiment of the present application, as illustrated in FIGS. 4 and 5, the speed reducer 102 includes the gear 1021, the bearing 1022, and a cam input shaft 1023. Here, the cam input shaft 1023 is engaged with the rotor 1011 of the motor 101 and rotates together. The gear 1021 includes an externally toothed gear 10211, which may be referred to as a flex spline, provided on an outer peripheral edge of the cam input shaft 1023 of the speed reducer 102, and an internally toothed gear 10212 that may be referred to as a circular spline. Although here, only structure of the speed reducer 102 related to the oil feeder 103 of the example embodiment of the present application has been described, the present application is not limited to the structure. The speed reducer 102 has another typical structure, and specifically, a related art can be referred to, and thus description of the other typical structure is eliminated here.

In one or more example embodiments, the oil feeder 103 is disposed between the motor 101 and the speed reducer 102, the rotor 1011 of the motor 101 is provided with the second protrusion 1013 that presses the second lubrication portion 1032 toward the speed reducer 102, and each of two second lubrication portions 1032 including the second lubrication portion 1032 is in contact with the bearing 1022 (steel ball group) at a position facing the speed reducer 102, as illustrated in FIG. 4. This structure enables applying the lubricating substance stored in the oil feeder 103 to the bearing 1022 of the speed reducer 102 with the second lubrication portions 1032, and thus enables achieving good lubrication effect. Besides this, when only one second lubrication portion 1032 is further provided in the oil feeder 103, for example, to allow the one second lubrication portion 1032 to be brought into contact with all steel balls in the steel ball group of the bearing 1022 due to a difference in rotational speed between the rotor 1011 provided with the oil feeder 103 and the bearing 1022 of the speed reducer 102 during rotation of the motor 101, good lubrication of the bearing 1022 can be achieved. The difference in rotational speed between the rotor 1011 and the bearing 1022 is, for example, caused by a revolution rotation speed of the steel ball group of the bearing 1022, the revolution rotation speed being half of a revolution speed of the rotor 1011, and besides this, the difference in rotational speed between both the members may have another numerical relationship.

In one or more example embodiments, the rotor 1011 of the motor 101 is provided with the first protrusion 1012 that presses the first lubrication portion 1031 toward the speed reducer 102, and each of two first lubrication portions 1031 including the first lubrication portion 1031 is in contact with the gear 1021 at the position facing the speed reducer 102, as illustrated in FIG. 5. This structure enables applying the lubricating substance stored in the oil feeder 103 to the gear 1021 of the speed reducer 102 with the first lubrication portions 1031, and thus enables achieving good lubrication effect. Besides this, for example, only one first lubrication portion 1031 or another number of first lubrication portions 1031 may be further provided in the oil feeder 103.

In one or more example embodiments, the gear 1021 of the speed reducer 102 is a harmonic drive gear, the harmonic drive gear including an internally toothed gear and an externally toothed gear, and the first lubrication portion 1031 is disposed to be insertable between the internally toothed gear and the externally toothed gear. This structure enables ensuring good lubrication of the gear of the speed reducer.

Figure 6A:
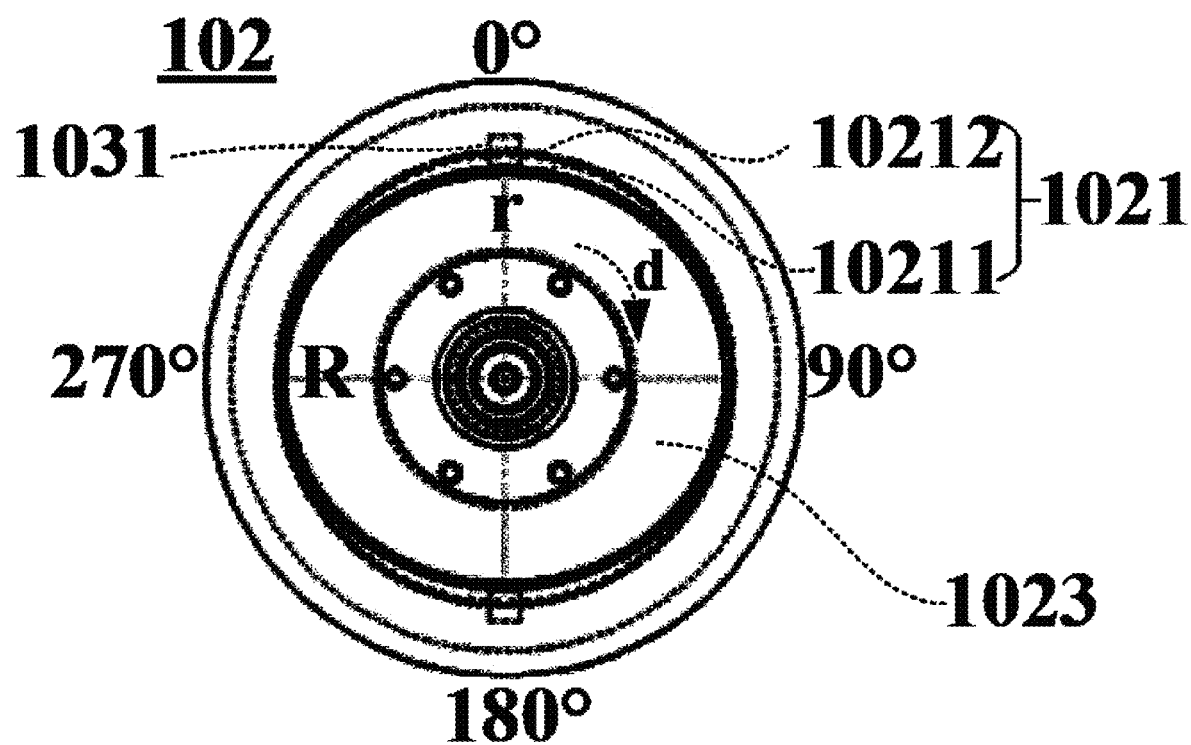
FIG. 6A is a plan view of an example of a speed reducer according to an example embodiment of the present application.
Figure 6B:
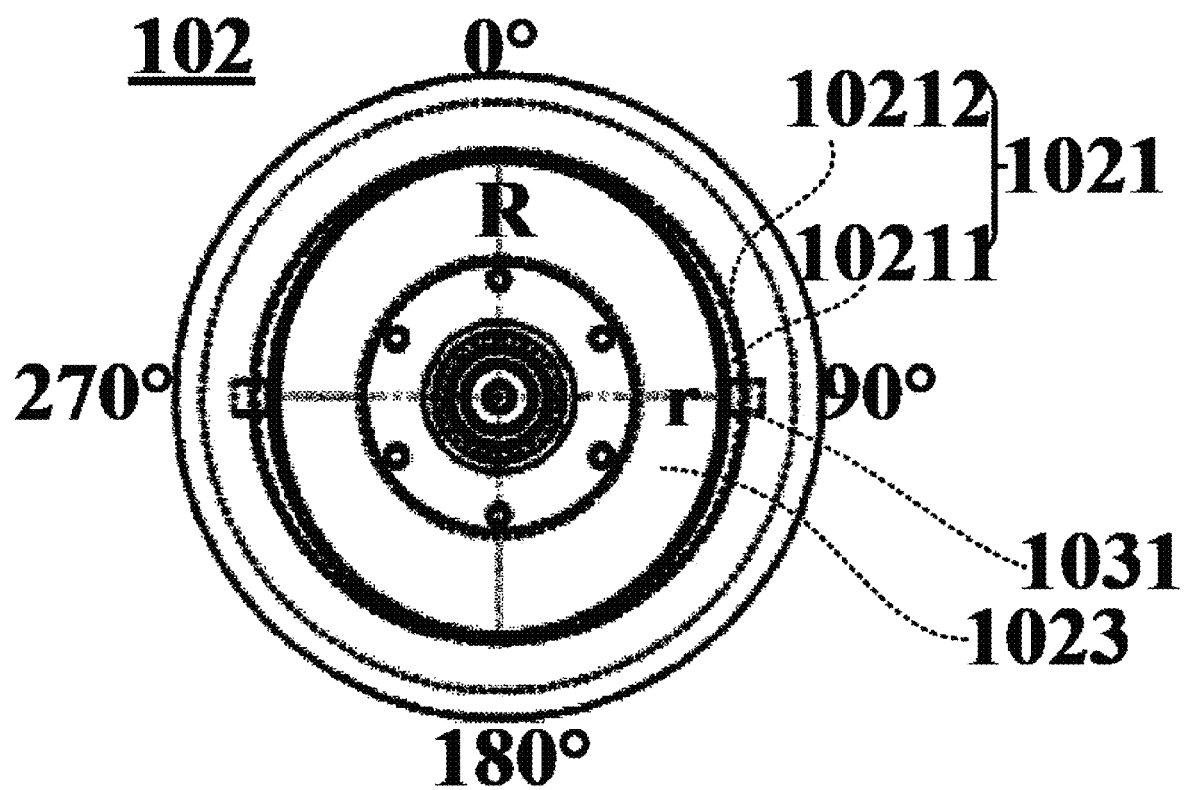
FIG. 6B is a plan view of another example embodiment of a speed reducer of the present application.

FIG. 6A is a plan view of an example of the speed reducer according to the example embodiment of the present application, and illustrates a state in which a gear is viewed from a motor side of the speed reducer. FIG. 6B is a plan view of another example of the speed reducer exemplified in the present application, and FIG. 6B illustrates a state in which an externally toothed gear of the gear of FIG. 6A rotates by 90° along an arrow d with a broken line illustrated in FIG. 6A.

In one or more example embodiments, the gear 1021 includes the externally toothed gear 10211 in an elliptical shape and the internally toothed gear 10212 in a circular shape, the externally toothed gear 10211 including teeth in a major axis direction R that meshes with teeth of the internally toothed gear 10212, and a gap is formed between teeth of the externally toothed gear 10211 in a minor axis direction r and the teeth of the internally toothed gear 10212, as illustrated in FIGS. 6A and 6B. In the present example embodiment, the oil feeder 103 is provided in the rotor (e.g., an upper rotor) of the motor, the rotor being connected to and locked to the cam input shaft 1023 of the speed reducer 102, and the rotor and the cam input shaft 1023 rotate together to rotate the rotor, the oil feeder 103, and the cam input shaft 1023 together. In this case, the first lubrication portion 1031 can be provided at a position in the oil feeder 103, the position corresponding to an end of the externally toothed gear in the minor axis direction, and when the motor provided with the oil feeder 103 rotates, the cam input shaft 1023 rotates together. When the cam input shaft 1023 has a rotation angle of 90°, the oil feeder 103 including the first lubrication portion 1031, and the cam input shaft 1023 including a part where a minor axis r and a major axis R are located, both rotate by 90° as illustrated in FIGS. 6A and 6B in which a frame 1031 with a dotted line is at a position corresponding to the first lubrication portion of the oil feeder 103 in the speed reducer 102, the frame 1031 being used to indicate the first lubrication portion 1031. The first lubrication portion 1031 is always in the gap formed between the teeth of the externally toothed gear 10211 in the minor axis direction r and the teeth of the internally toothed gear 10212, so that the first lubrication portion 1031 can be sufficiently in contact with the gear 1021, and thus better lubrication of the gear 1021 of the speed reducer 102 can be achieved.

In one or more example embodiments, the first lubrication portion 1031 and the second lubrication portion 1032 may be located and aligned in the radial direction of the oil feeder 103.

Figure 7:
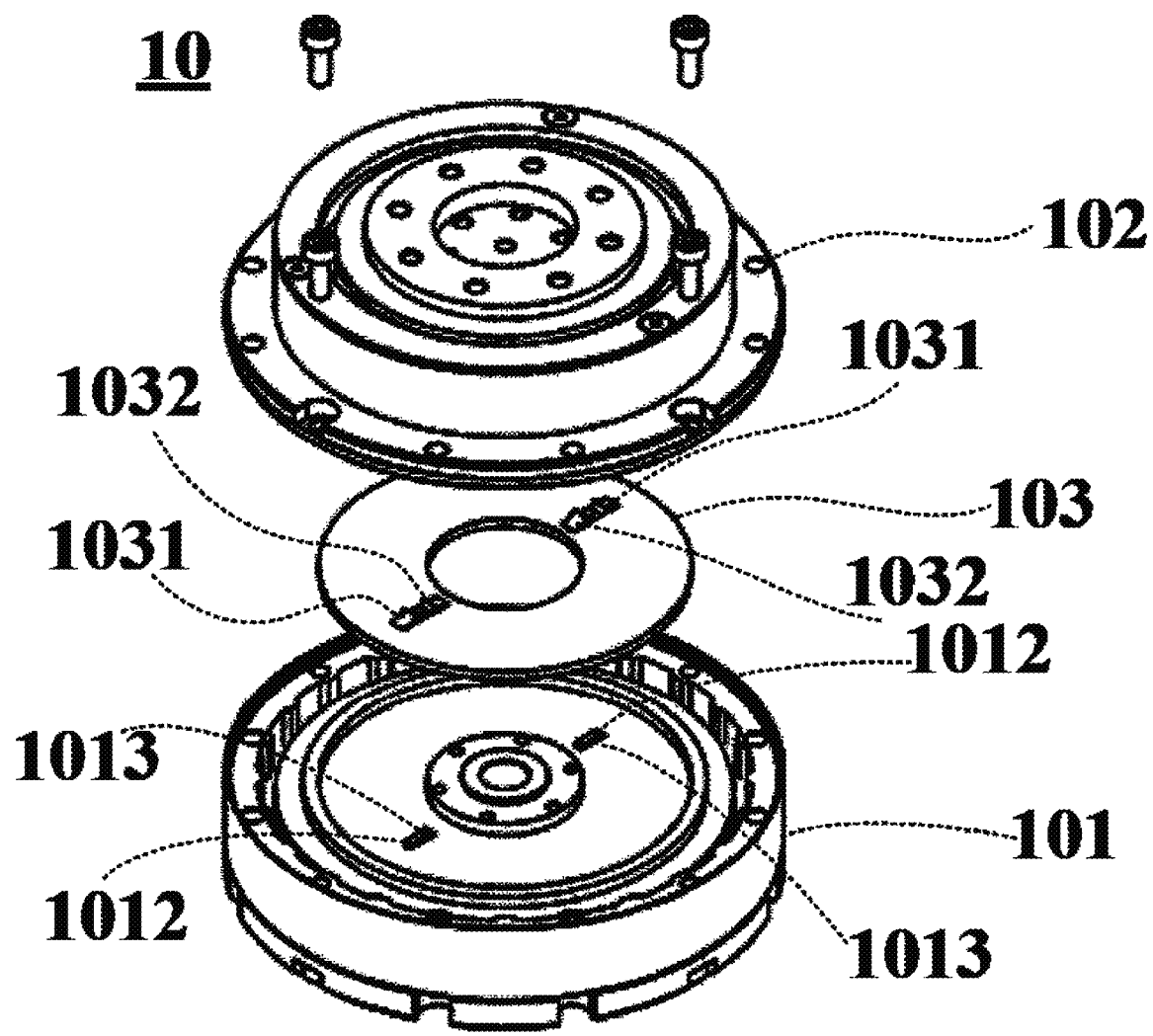
FIG. 7 is an exploded view of another example of a motor assembly according to an example embodiment of the present application.

FIG. 7 is an exploded view of another example of the motor assembly of the example embodiment of the present application. As illustrated in FIG. 7, the oil feeder 103 is provided with two first lubrication portions 1031 and two second lubrication portions 1032. Then, one of the first lubrication portions 1031 and corresponding one of the second lubrication portions 1032 are located and aligned in the radial direction of the oil feeder 103, and the other first lubrication portion 1031 and the other second lubrication portion 1032 are located and aligned in the radial direction of the oil feeder 103. For example, although the radial direction may be a direction parallel to the minor axis direction of the externally toothed gear of the harmonic drive speed reducer in the oil feeder 103, the present disclosure does not limit the direction, and the radial direction may be another radial direction. In this case, the first protrusion 1012 and the second protrusion 1013 provided in the motor 101 may be correspondingly aligned in the radial direction, and the first protrusion 1012 and the second protrusion 1013 at the same position may be formed as one bump, thereby enabling processing of the protrusion to be simplified.

According to the above example embodiment, the oil feeder 103 is disposed between the motor 101 and the speed reducer 102, and the first lubrication portion 1031 and the second lubrication portion 1032 of the oil feeder 103 lubricate the gear 1021 and the bearing 1022 of the speed reducer 102, respectively. As a result, the speed reducer is not required to be changed in design, and the life and accuracy of the speed reducer can be secured by simultaneously lubricating the bearing and the gear of the speed reducer. Additionally, when a sponge sheet or a soft plastic sheet, for example, formed by simple press molding is used as the oil feeder, both cost reduction and an advantage of easy assembly can be achieved, and thus product competitiveness can be enhanced.

Although it should be noted that only exemplary description is shown for the present application, the present application is not limited to the description, and appropriate modifications can be made in addition to each example embodiment described above. Although only exemplary description is made for each member in the above description, the present application is not limited to the description, and specific contents of each member can be referred to the related art.

Although the present application is described by combining specific example embodiments, it should be understood by a person skilled in the art that these descriptions are exemplary and not restrictive of the scope of claims of the present application. A person skilled in the art may make various modifications and corrections to this application based on the idea and principle of the present application, and these modifications and corrections are also within the scope of the present application.

The preferred example embodiments of the present application have been described above with reference to the accompanying drawings. Many features and advantages of these example embodiments are apparent from this detailed description. Thus, the appended claims are intended to cover all of these features and advantages that are within the true spirit and scope of these example embodiments. Additionally, a person skilled in the art will readily conceive of many corrections and modifications, so that the example embodiments of the present application are not limited to the precise structure and operation illustrated and described, and thus all appropriate corrections and equivalents within the scope of the example embodiments can be included.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor assembly comprising:
a motor;
a speed reducer attached to one axial end of the motor; and
an oil feeder between the motor and the speed reducer, the oil feeder being made of a material having elasticity and capable of storing a lubricating substance; wherein
the oil feeder includes:
 a first lubrication portion to lubricate a gear of the speed reducer; and
 a second lubrication portion to lubricate a bearing of the speed reducer; and
each of the first lubrication portion and the second lubrication portion protrudes toward the speed reducer with respect to a surface of the oil feeder opposing the speed reducer.

2. The motor assembly according to claim 1, wherein
the motor is provided with a surface opposing the speed reducer, the surface including:
at least one first protrusion that presses the oil feeder toward the speed reducer to define the first lubrication portion; and
at least one second protrusion that presses the oil feeder toward the speed reducer to define the second lubrication portion.

3. The motor assembly according to claim 2, wherein
the first protrusion is integral with or separate from the motor; and
the second protrusion is integral with or separate from the motor.

4. The motor assembly according to claim 1, wherein
the first lubrication portion and the second lubrication portion are located and aligned in a radial direction of the oil feeder.

5. The motor assembly according to claim 1, wherein
the first lubrication portion and the second lubrication portion are provided at an interval in a circumferential direction of the oil feeder.

6. The motor assembly according to claim 1, wherein
the first lubrication portion is one of first lubrication portions and the second lubrication portion is one of second lubrication portions.

7. A motor assembly comprising:
a motor including a rotor;
a speed reducer attached to one axial end of the motor; and
an oil feeder between the motor and the speed reducer, the oil feeder being made of a material having elasticity and capable of storing a lubricating substance; wherein
the oil feeder is in the rotor to be rotatable with the rotor;
the oil feeder is between the rotor and the speed reducer; and
the oil feeder includes:
 a first lubrication portion to lubricate a gear of the speed reducer; and
 a second lubrication portion to lubricate a bearing of the speed reducer.

8. The motor assembly according to claim 7, wherein
each of the first lubrication portion and the second lubrication portion protrudes toward the speed reducer with respect to a surface of the oil feeder opposing the speed reducer.

9. The motor assembly according to claim 7, wherein
the speed reducer is a harmonic drive reducer;
the gear is a harmonic drive gear;
the harmonic drive gear includes an internally toothed gear and an externally toothed gear; and
the first lubrication portion is insertable between the internally toothed gear and the externally toothed gear.

10. A motor assembly comprising:
a motor;
a speed reducer attached to one axial end of the motor; and
an oil feeder between the motor and the speed reducer, the oil feeder being made of a material having elasticity and capable of storing a lubricating substance; wherein
the speed reducer is a harmonic drive reducer;
the oil feeder includes:
 a first lubrication portion to lubricate a gear of the speed reducer; and
 a second lubrication portion to lubricate a bearing of the speed reducer;
the gear is a harmonic drive gear;
the harmonic drive gear includes an internally toothed gear and an externally toothed gear; and
the first lubrication portion is insertable between internally toothed gear and the externally toothed gear.

11. The motor assembly according to claim 10, wherein
each of the first lubrication portion and the second lubrication portion protrudes toward the speed reducer with respect to a surface of the oil feeder opposing the speed reducer.

12. The motor assembly according to claim 10, wherein
the motor includes a rotor;
the oil feeder is in the rotor to be rotatable with the rotor;
the oil feeder is between the rotor and the speed reducer; and
each of the first lubrication portion and the second lubrication portion protrudes toward the speed reducer with respect to a surface of the oil feeder opposing the speed reducer.

* * * * *